Feb. 5, 1946.   R. W. WILKINSON ET AL   2,394,415
PORTABLE SPRAYER
Filed Nov. 29, 1944

INVENTORS.
Ralph W. Wilkinson
Clarence E. Wilkinson
BY
ATTORNEY.

Patented Feb. 5, 1946

2,394,415

UNITED STATES PATENT OFFICE 2,394,415

PORTABLE SPRAYER

Ralph W. Wilkinson and Clarence E. Wilkinson, Kansas City, Mo.

Application November 29, 1944, Serial No. 565,605

5 Claims. (Cl. 299—85)

This invention relates to improvements in portable sprayers for use in spraying vegetables, flowers, trees and other vegetation with a toxic mixture for the control of insects, fungus growth and other types of blight. It relates more particularly to improvements in sprayers utilizing a tank divided into two compartments by a flexible partition, which compartments are alternately filled and emptied with a toxic spraying mixture. The liquid supplied under pressure to one compartment forces accummulated spraying mixture from the opposite compartment through a spray device.

Conventional sprayers of this type, such as disclosed in the United States Patent 1,831,979 issued November 17, 1931, utilize a manually operated valve for controlling the flow of liquid to the empty compartments and the discharge of liquid from the filled compartment.

An important object of this invention is to provide a sprayer with automatic valves for simultaneously switching the liquid supply from a filled compartment to an empty compartment and the discharge from an empty compartment to a filled compartment by reversal of the tank.

Another object is the manner of introducing the toxic material to the fluid.

A further object is its simplicity, ease of operation and facility of cleaning.

Other and further objects of this invention will appear from the following description.

Figure 1:
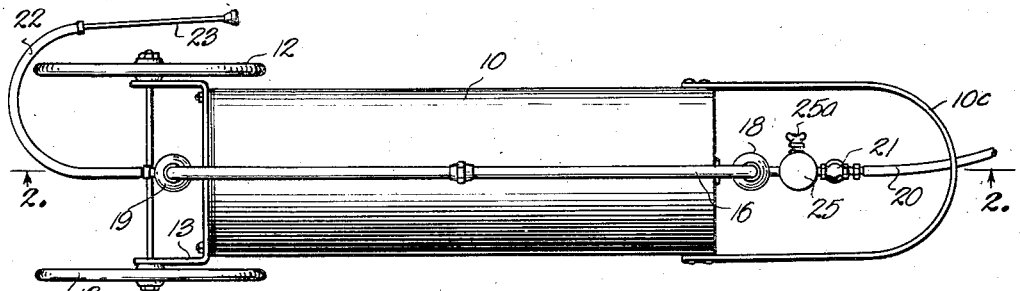
Figure 2:
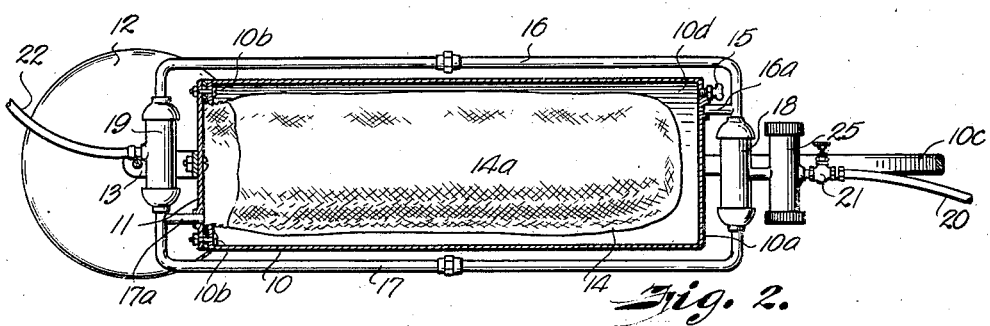
Figure 3:
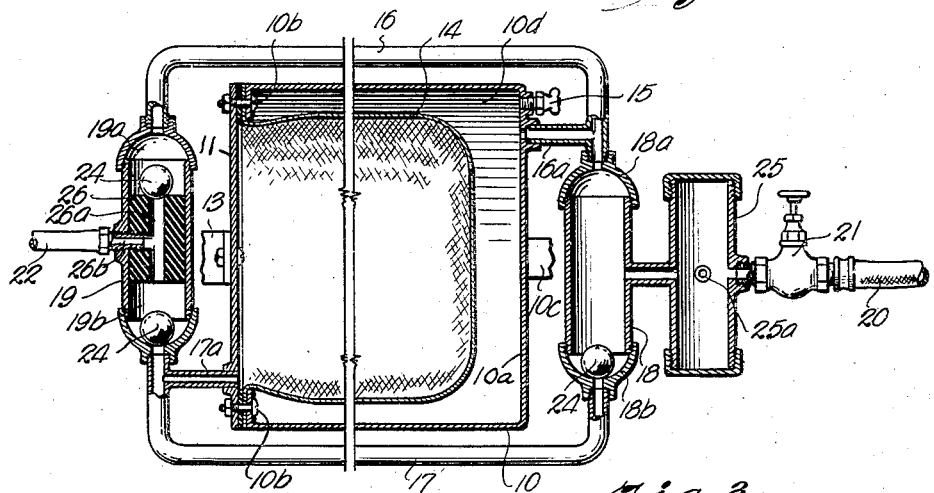
Figure 4:
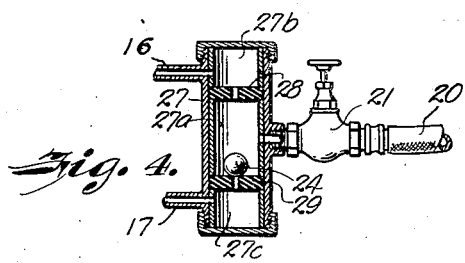

In the accompanying drawing, which forms a part of the specification and which is to be read in conjunction therewith and in which like reference numerals are employed to indicate like parts in the various views, Fig. 1 is a plan view of a sprayer embodying the invention, Fig. 2 is a side view of the sprayer partially in section, Fig. 3 is an enlarged sectional side view of the sprayer with the center section of the assembly broken away, and Fig. 4 is a sectional side view showing a modified type of intake valve.

Referring to the drawing the numeral 10 designates a cylindrical tank closed at one end by an integrally formed plate 10a and at the other end by a head plate or cover 11 bolted to flange 10b. Wheels 12 are bolted to head plate 11 by a suitable bracket 13 and at the other end of the tank is a handle 10c. A flexible bag or partition 14 of waterproof material is fastened at its open end in tank 10 between flange 10b and plate 11 forming a liquid-tight seal therebetween. Bag 14 divides the tank into two compartments 10d and 14a of variable capacities. Stop cock 15 serves as an air release valve or liquid drain valve for compartment 10d.

Manifolds 16 and 17 surround the tank and are each connected to inlet valve 18 and discharge valve 19 positioned at opposite ends of the tank. Manifold 16 is connected to compartment 10d by pipe 16a and manifold 17 is connected to compartment 14a by pipe 17a. Inlet valve body 18, through connections hereinafter explained, receives water from the city tap through hose 20 and valve 21.

Discharge valve 19 is connected by hose 22 to spray device 23. The valve body 18 has end caps in which are valve seats 18a and 18b and which are screw threaded to receive the ends of manifolds 16 and 17. A ball 24 is free to move within the valve body 18 and seats at the lower end of the valve according to the position of the tank. The water supplied through a hose 20 is therefore directed through the top of the valve, thence to one of the compartments through one of the manifolds 16 or 17. Obviously, the reversal of the tank inverts the valve 18 changing the direction of flow of water therethrough and directs the water to the opposite compartment. To dissolve or suspend a toxic material or poison in the water supplied to the compartments there is interposed in the charging line between valve 18 and valve 21 a reservoir or charger 25. This charger is a short piece of pipe threaded at its ends to receive removable end caps. The charger is equipped with a pressure relief valve 25a for releasing the liquid pressure in the device after it has been used and before refilling the poison chamber.

The discharge valve 19 is divided into two valve chambers 19a and 19b by a cylindrical seat 26 through which is an axial passage 26a and a radial discharge outlet 26b. Balls 24 are free to move in chambers 19a and 19b. When the valve 19 is in a vertical position the upper ball rests upon seat 26 closing the upper manifold outlet. Obviously, when one compartment is connected to the liquid supply the opposite compartment is connected to the spray device 23.

It is believed that the operation of the sprayer is apparent from the foregoing description. The sprayer is connected to a suitable supply of water under pressure, such as a city water tap, with valve 21 shut off. The sprayer is rolled to a desired location and the handle end is lowered to rest on the ground, in a position shown in Fig. 2, placing both inlet valve 18 and discharge valve 19 in vertical or operative positions. Charger 25 is filled with the desired toxic material and air cock 15 is opened. Valve 21 is then opened and water enters the sprayer passing through charger 25 where it dissolves or mixes with the toxic material. The mixture passes into compartment 10d, the lower ball in the inlet valve and the upper ball in the discharge valve being seated. The pressure of the toxic mixture in compartment 10d collapses bag 14 ejecting any air or liquid contained in the bag through the sprayer 23. When compartment 10d is filled with a spraying mixture valve 21 and vent 15 are closed. To fill the other compartment and to eject the spraying mixture from the compartment 10d the tank is reversed on its longitudinal axis, the axle of the ground wheels serving as a pivot and the handle end rotated through 180°. The pressure relief valve 25a is now opened to relieve any pressure in the charger before replenishing it with toxic material. The charger 25 is again filled with toxic material and its top removable cap replaced. Valve 21 is again opened and the toxic spraying mixture is now supplied under pressure to compartment 14a within the bag in the same fashion as mixture was previously supplied compartment 10d. The spraying mixture previously supplied to compartment 10d is forced out through pipes 16a, manifold 16, discharge valve 19, hose 22 and the sprayer 23. During this operation the upper ball in the discharge valve is kept seated by the mixture being charged to the flexible bag compartment 14a.

The reservoir 25 may be repeatedly filled with toxic materials as explained and the tank reversed supplying a substantially continuous source of toxic mixture for spraying.

When the spraying operation is completed, liquid in bag 14 is then drained by raising the tank to a vertical position unseating the balls in exhaust valve 19 permitting the liquid to drain through the sprayer 23 when stop cock 15 is opened. Liquid within compartment 10d is drained through stop cock 15 when the stop cock is at a low point.

The modification shown in Fig. 4 is a combination inlet valve and charger which may be substituted for the two devices 18 and 25 shown in previous figures. The structure includes a cylinder 27 with removable caps at its ends. It is connected near one end with manifold 16, near its other end with manifold 17, and centrally with valve 21. Two disks 28 and 29 with central apertures divide the cylinder 27 into a central valve chamber 27a and reservoirs 27b and 27c for toxic material at the ends. A ball 24 is free to move in valve chamber 27a and when the cylinder 27 is in a vertical position seats against the lower apertured disk 28 or 29 as the case may be. Thus, the flow of liquid through the cylinder 27 is directed through the upper reservoir 27b. In employing the modified inlet valve charger the operation of filling the compartments is the same as that previously described.

It is contemplated that other methods may be employed to put toxic materials into water introduced into the sprayer.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawing is to be interpreted as illustrative and not in a limiting sense.

Having thus described our invention, we claim:

1. A portable sprayer comprising a tank reversible on its longitudinal axis, means within the tank for dividing it into two compartments of variable capacities, the tank compartments having a constant total capacity, a liquid pressure supply connection, a spray device, means for introducing a toxic material into the liquid to be sprayed, means connecting each compartment with the liquid supply connection, the spray device and the means for introducing toxic material, and valves in said connecting means, whereby the spraying liquid supplied under pressure to one compartment when the tank is in one position forces previously furnished spraying liquid from the other compartment through the spray device and reversal of the tank refills the depleted compartment with a spraying liquid forcing the accumulated liquid from the opposite compartment through the spray device.

2. A sprayer as in claim 1 in which the valves in said connecting means are automatic in their operation with the reversal of the tank.

3. A sprayer as in claim 1 in which the tank is mounted on wheels.

4. A portable sprayer comprising a tank reversible on its longitudinal axis, means within the tank for dividing it into two compartments of variable capacities, the tank compartments having a constant total capacity, a liquid pressure supply connection, a reservoir for toxic materials connected to said liquid supply connection, a spray device, means connecting the compartments with both the liquid supply connection and the spray device, and valves in said connecting means, whereby the liquid toxic mixture charged under pressure to one compartment when the tank is in one position forces previously accumulated liquid toxic mixture from the other compartment through the spray device and reversal of the tank refills the depleted compartment with the spraying mixture forcing the mixture from the opposite compartment through the spray device.

5. A portable sprayer comprising a tank reversible on its longitudinal axis, means within the tank for dividing it into two compartments of variable capacities, the tank compartments having a constant total capacity, a liquid pressure supply connection, a unitary structure connected to the liquid supply connection, said structure having two outlets, reservoirs in the structure for toxic materials, an automatic valve in the structure interposed between the liquid supply connection and the reservoirs, a spray device, means connecting each compartment with an outlet and with the spray device, and automatic valves in said connecting means, whereby toxic liquid charged to one compartment when the tank is in one position forces previously accumulated toxic liquid from the other compartment through the spray device and reversal of the tank refills the depleted compartment with toxic liquid forcing toxic liquid from the opposite compartment through the spray device.

RALPH W. WILKINSON.
CLARENCE E. WILKINSON.